US 7,702,574 B2

(12) United States Patent
Lawrence (10) Patent No.: US 7,702,574 B2
(45) Date of Patent: Apr. 20, 2010

(54) INDEPENDENT RESEARCH CONSENSUS EARNINGS ESTIMATES AND METHODS OF DETERMINING SUCH

(75) Inventor: David Lawrence, New York, NY (US)

(73) Assignee: Goldman Sachs & Co., New York, NY (US)

( * ) Notice: Subject to any disclaimer, the term of this patent is extended or adjusted under 35 U.S.C. 154(b) by 1829 days.

(21) Appl. No.: 10/713,421

(22) Filed: Nov. 14, 2003

(65) Prior Publication Data

US 2004/0138998 A1 Jul. 15, 2004

Related U.S. Application Data

(60) Provisional application No. 60/426,171, filed on Nov. 14, 2002.

(51) Int. Cl.
*G06Q 40/00* (2006.01)
(52) U.S. Cl. .......................................... 705/38; 705/35
(58) Field of Classification Search ................... 705/36, 705/35, 38
See application file for complete search history.

(56) References Cited

U.S. PATENT DOCUMENTS

| | | | |
|---|---|---|---|
| 4,326,259 A | 4/1982 | Cooper et al. | 364/715 |
| 4,346,442 A | 8/1982 | Musmanno | 364/408 |
| 4,376,978 A | 3/1983 | Musmanno | 364/408 |
| 4,597,046 A | 6/1986 | Musmanno et al. | 364/408 |
| 4,718,009 A | 1/1988 | Cuervo | 364/408 |
| 4,727,243 A | 2/1988 | Savar | 235/379 |
| 4,734,564 A | 3/1988 | Boston et al. | 235/380 |
| 4,736,294 A | 4/1988 | Gill et al. | 364/408 |
| 4,774,663 A | 9/1988 | Musmanno et al. | 364/408 |
| 4,774,664 A | 9/1988 | Campbell et al. | 364/408 |
| 4,812,628 A | 3/1989 | Boston et al. | 235/380 |
| 4,868,866 A | 9/1989 | Williams, Jr. | 380/49 |
| 4,914,587 A | 4/1990 | Clouse | 364/408 |

(Continued)

FOREIGN PATENT DOCUMENTS

| | | |
|---|---|---|
| EP | 1 137 209 | 3/2001 |
| EP | 1 143 365 | 4/2001 |
| JP | 02000020618 A | 6/1998 |
| JP | 0200350896 A | 8/2001 |
| WO | WO 00/75836 | 12/2000 |
| WO | WO 01/55885 | 8/2001 |

OTHER PUBLICATIONS

Birger, Jon, "Why Analysts Still Matter", Jul. 2002, Money, vol. 31 Issue 7.*
"Dictionary of Finance and Investment Terms", 1998, Barron's, Fifth Edition, pp. 76 and 482.*

(Continued)

*Primary Examiner*—Hani Kazimi
(74) *Attorney, Agent, or Firm*—Walter G. Hanchuk; Chadbourne & Parke LLP (57) ABSTRACT

Apparatus and methods are described for correlating business relationships and issuing earnings estimates. According to the present invention, an earnings estimate can be generated for a company as it compares to a consensus estimate, or other rating aggregate, along with an indication of an investment banking relationship or other business relationship that the entity providing the estimate has had with the company. In addition to a consensus estimate that may be based upon current and previous analyst earnings estimates, operating actuals, expected reporting dates, footnotes and company-issued guidelines, indications of investment banking relationships and a consensus estimate is provided that excludes input from banks conducting business with the company. The present invention can also include suggested actions that can be taken based upon data relating to an investment banking relationship, an earnings estimate and/or a consensus earnings estimate that excludes input from banks with substantial business relationships with the company.

25 Claims, 6 Drawing Sheets

U.S. PATENT DOCUMENTS

| | | | | |
|---|---|---|---|---|
| 4,953,085 | A | 8/1990 | Atkins | 364/408 |
| 4,989,141 | A | 1/1991 | Lyons et al. | 364/408 |
| 5,025,138 | A | 6/1991 | Cuervo | 235/379 |
| 5,038,284 | A | 8/1991 | Kramer | 364/408 |
| 5,068,888 | A | 11/1991 | Scherk et al. | 379/100 |
| 5,161,103 | A | 11/1992 | Kosaka et al. | 364/408 |
| 5,177,342 | A | 1/1993 | Adams | 235/379 |
| 5,210,687 | A | 5/1993 | Wolfberg et al. | 364/408 |
| 5,239,462 | A | 8/1993 | Jones et al. | 364/408 |
| 5,274,547 | A | 12/1993 | Zoffel et al. | 364/408 |
| 5,323,315 | A | 6/1994 | Highbloom | 364/408 |
| 5,347,632 | A | 9/1994 | Filepp et al. | 395/200 |
| 5,398,300 | A | 3/1995 | Levey | 395/22 |
| 5,444,819 | A | 8/1995 | Negishi | 395/22 |
| 5,457,305 | A | 10/1995 | Akel et al. | 235/379 |
| 5,557,518 | A | 9/1996 | Rosen | 364/408 |
| 5,627,886 | A | 5/1997 | Bowman | 379/111 |
| 5,649,116 | A | 7/1997 | McCoy et al. | 395/238 |
| 5,679,938 | A | 10/1997 | Templeton et al. | 235/379 |
| 5,679,940 | A | 10/1997 | Templeton et al. | 235/380 |
| 5,696,907 | A | 12/1997 | Tom | 395/238 |
| 5,704,045 | A | 12/1997 | King et al. | 395/235 |
| 5,717,923 | A | 2/1998 | Dedrick | 395/613 |
| 5,732,397 | A | 3/1998 | DeTore et al. | 705/1 |
| 5,787,402 | A | 7/1998 | Potter et al. | 705/37 |
| 5,790,639 | A | 8/1998 | Ranalli et al. | 379/100.08 |
| 5,797,133 | A | 8/1998 | Jones et al. | 705/38 |
| 5,819,226 | A | 10/1998 | Gopinathan et al. | 705/1 |
| 5,819,236 | A | 10/1998 | Josephson | 705/35 |
| 5,852,812 | A | 12/1998 | Reeder | 705/39 |
| 5,875,431 | A | 2/1999 | Heckman et al. | 705/7 |
| 5,878,400 | A | 3/1999 | Carter, III | 705/20 |
| 5,884,289 | A | 3/1999 | Anderson et al. | 705/44 |
| 5,940,843 | A | 8/1999 | Zucknovich et al. | 707/516 |
| 5,963,923 | A | 10/1999 | Garber | 705/37 |
| 5,991,743 | A | 11/1999 | Irving et al. | 705/36 |
| 6,014,228 | A | 1/2000 | Castro | 358/400 |
| 6,016,963 | A | 1/2000 | Ezawa et al. | 235/492 |
| 6,018,723 | A | 1/2000 | Siegel et al. | 705/38 |
| 6,021,397 | A | 2/2000 | Jones et al. | 705/36 |
| 6,078,904 | A | 6/2000 | Rebane | 705/36 |
| 6,078,905 | A | 6/2000 | Pich-LeWinter | 705/36 |
| 6,085,175 | A | 7/2000 | Gugel et al. | 705/36 |
| 6,119,103 | A | 9/2000 | Basch et al. | 705/35 |
| 6,148,301 | A | 11/2000 | Rosenthal | 707/10 |
| 6,199,073 | B1 | 3/2001 | Peairs et al. | 707/204 |
| 6,205,433 | B1 | 3/2001 | Boesch et al. | 705/26 |
| 6,219,805 | B1 | 4/2001 | Jones et al. | 714/38 |
| 6,249,770 | B1 | 6/2001 | Erwin et al. | 705/10 |
| 6,278,983 | B1 | 8/2001 | Ball | 705/39 |
| 6,289,320 | B1 | 9/2001 | Drummond et al. | 705/35 |
| 6,304,973 | B1 | 10/2001 | Williams | 726/3 |
| 6,317,727 | B1 | 11/2001 | May | 705/37 |
| 6,321,212 | B1* | 11/2001 | Lange | 705/36 R |
| 6,330,546 | B1 | 12/2001 | Gopinathan et al. | 705/35 |
| 6,341,267 | B1 | 1/2002 | Taub | 705/11 |
| 6,347,307 | B1 | 2/2002 | Sandhu et al. | 705/35 |
| 6,393,423 | B1 | 5/2002 | Goedken | 707/10 |
| 6,456,984 | B1 | 9/2002 | Demoff et al. | 705/40 |
| 6,681,211 | B1* | 1/2004 | Gatto | 705/36 R |
| 6,882,850 | B2* | 4/2005 | McConnell et al. | 455/453 |
| 7,069,434 | B1* | 6/2006 | Ilnicki et al. | 713/153 |
| 2001/0011243 | A1 | 8/2001 | Dembo et al. | 705/36 |
| 2001/0027388 | A1 | 10/2001 | Beverina et al. | 703/22 |
| 2001/0027389 | A1 | 10/2001 | Beverina et al. | 703/22 |
| 2001/0047279 | A1 | 11/2001 | Gargone | 705/1 |
| 2001/0049651 | A1 | 12/2001 | Selleck | 705/37 |
| 2001/0054020 | A1 | 12/2001 | Barth et al. | 705/37 |
| 2002/0016854 | A1 | 2/2002 | Hirasawa et al. | 709/236 |
| 2002/0019804 | A1 | 2/2002 | Sutton | 705/38 |
| 2002/0022988 | A1* | 2/2002 | Columbus et al. | 705/11 |
| 2002/0032635 | A1 | 3/2002 | Harris et al. | 705/37 |
| 2002/0032646 | A1 | 3/2002 | Sweeney et al. | 705/38 |
| 2002/0046053 | A1 | 4/2002 | Hare et al. | 705/1 |
| 2002/0091635 | A1 | 7/2002 | Dilip et al. | 705/39 |
| 2002/0099640 | A1 | 7/2002 | Lange | 705/37 |
| 2002/0103747 | A1 | 8/2002 | Lawrence | 705/38 |
| 2002/0111890 | A1 | 8/2002 | Sloan et al. | 705/36 |
| 2002/0138371 | A1 | 9/2002 | Lawrence et al. | 705/27 |
| 2002/0138407 | A1 | 9/2002 | Lawrence et al. | 705/38 |
| 2002/0138408 | A1 | 9/2002 | Lawrence | 705/38 |
| 2002/0143562 | A1 | 10/2002 | Lawrence | 705/1 |
| 2003/0046095 | A1* | 3/2003 | Jessop et al. | 705/1 |
| 2003/0069742 | A1 | 4/2003 | Lawrence | 705/1 |
| 2003/0074310 | A1 | 4/2003 | Grovit et al. | 705/39 |
| 2003/0172014 | A1* | 9/2003 | Quackenbush et al. | 705/35 |

OTHER PUBLICATIONS

McGuigan, James and King, William R., "Evaluating Alternative Stock Option Timing Strategies", Sep. 1974, University of Washington School of Business Administration, The Journal of Financial and Quantitative Analysis vol. 9 No. 4, pp. 567-578.*

Nocera, Joseph and Kover, Amy, "Who Really Moves The Market?", Oct. 27, 1997, Fortune, vol. 136 Issue 8, pp. 90-110.*

Concord EFS Inc, "Concord EFS Provides Update On Network Consolidation Progress, Uniform Pricing For Debit Network Set", Business Wire, Aug. 30, 2001.*

"Firms Consider Pact to Track Terror Money." Wall Street Journal, Nov. 26, 2001.

World-Check Search—Vladimir Gusinsky (Russia).

"Transforming Discovery Into Opportunity"; "Key Personnel Bios"; "Frequently Asked Questions"; Mantas. Mantas, Inc., Announces Funding and Management Team:, Mantas, Jun. 4, 2001. "Safeguard and SRA Partner to Launch Mantas, Inc:", Mantas, Jun. 4, 2001. "Knowledge Discovery Platform"; "Money Laundering Detection for Banks"; "Fraud and Money Laundering Detection for Securities Firms"; "Best Execution"; "Equities Trading Compliance", Mantas.

Power, Stephen "Background Checks Await Fliers." The Wall Street Journal, Jun. 7, 2002.

Purcell, Lea "Roping in Risk." Factiva, May 1, 1994.

McLure, Leslie "Taking the Risk Out of Transactions." Factiva, Mar. 1, 1994.

Healy, Thomas J. "The New Science of Borrower Behavior." Factiva, Feb. 1, 1998.

Quinn, Jane Bryant "Credit Card Issuers; Keeping a Closer Watch on How You Pay Bills." The Washington Post, Apr. 25, 1988.

Gullo, Karen "Neutral Nets Versus Card Fraud; Chase's Software Learns to Detect Potential Crime." The American Banker, Feb. 2, 1990.

Grafton, David. "Analysing Customers With Behavioural Modelling." Credit Control, vol. 17, 1996, pp. 27-31.

Aguais, Scott D. "It's the Economy." Credit Card Management, vol. 5, 1993, pp. 58-60.

"Five Ways to Reduce Risk with Neutral Networks." Credit Risk Management Report, vol. 3, Jun. 27, 1993.

Leonard, Kevin J. and William J. Banks. "Automating the Credit Decision Process." Journal of Retail Banking, vol. 16, 1994, p. 39.

Higgins, Kevin T. "Retention by the Numbers." Credit Card Management, vol. 5, 1993, pp. 52-56.

Caudill, Maureen et al., "Naturally Intelligent Systems." The MIT Press, 1990.

"Enterprise Anti-Money Laundering Product Specification." Mantas, 2001.

Everest-Hill, Deborah et al., "Automating Risk Assessment." The Internal Auditor, vol. 56, Jun. 1999, pp. 23-25.

Chandler, Gary "Credit Scoring; A Feasibility Study." Executive, 1985.

Hicks M., "What, me spam?" Good intentions alone aren't enough to avoid alienating customers, e Week Sep. 3, 2001, retrieved from Dialog, Dialog No. 08984028, see abstract.

Banasiak, Michael, "Don't be Out-Scored by Your Competition", Credit and Financial Management Review, 2nd Quarter 2000.

Barrett, Jennifer, "Banking on Software Solutions", Newsweek Web, Jun. 12, 2002.

* cited by examiner

410 AGGREGATE HISTORICAL INFORMATION RELATING TO BUSINESS RELATIONSHIPS BETWEEN AN ENTITY PROVIDING AN ESTIMATE AND COMPANY

411 ANALYZE HISTORICAL RELATIONSHIPS AND ESTIMATES AS COMPARED TO ACTUAL EARNINGS

412 EXTRAPOLATE HISTORICAL PERSPECTIVE WITH CURRENT DATA

413 GENERATE A SUGGESTED ACTION

INDEPENDENT RESEARCH CONSENSUS EARNINGS ESTIMATES AND METHODS OF DETERMINING SUCH

CROSS REFERENCE TO RELATED APPLICATIONS

This application claims the benefit of the filing date of U.S. Provisional application No. 60/426,171 entitled "Independent Research Consensus Earnings Estimates and Methods of Determining Such", filed Nov. 14, 2002.

BACKGROUND

The present invention relates to a methods and systems for limiting risks associated with a rating supplied by an investment bank relating to a company's earning estimate and/or an investment recommendation ("Risks").

The capital markets in a country such as the United States may be the most sophisticated and regulated in the world. Research departments of financial institutions analyze and arrive at various estimations of corporate performance, typically for companies whose securities are publicly traded. This type of research, analysis and estimation are an important component to the efficient functioning of such markets. Research analysts develop and utilize specific models to arrive at quarterly earnings estimates for a given company or companies which they cover. Typically such earnings estimates are expressed in terms of earnings per share.

Consensus estimates have been developed which reflect an aggregated view of multiple analysts to arrive at a "consensus" number of range of numbers of expected earnings per share for a particular interval, such as a fiscal quarter. One well known provider of such consensus estimates is, for example, is Thomson "First Call®".

Recently, however, the integrity of research provided by financial institutions has been called into question where the financial institutions with research departments either have, or hope to, achieve banking relationships with companies covered by their research departments. Presently, regulatory, governmental, legislative and media investigators, class action attorneys and the public are questioning whether analyst reporting may have been unduly influenced by business or banking relationships.

The implications of these questions are beginning to play out in class action litigations, the opinions of commentators and proposed regulations. Arguments have been advanced that analysts provide earnings estimates and other subjective data for reasons that may be influenced by business relationships, such as investment banking activity, with the company. Presently there is no way to determine, based upon a consensus earnings estimate, which estimates have been provided from financial institutions with banking relationships from covered companies and which estimates have not.

Accordingly, what is needed is a method and system in which a consensus earnings estimate can be provided in such a way to identify and aggregate earnings per share estimates provided by financial institutions with existing or proposed banking or financial relationships with covered companies and those earning per share estimates provided by financial institutions or researchers who do not. Consensus estimates can then be provided in a meaningful manner devoid of any real or imagined influence arising from such relationships.

DETAILED DESCRIPTION

The present invention includes methods and systems for correlating business relationships and issuing earnings estimates. In particular, embodiments of the present invention include methods and systems for presenting an earnings estimate for a company as it compares to a consensus estimate, or other rating aggregate, along with an indication of an investment banking relationship that the entity providing the estimate has had with the company. For example, in addition to a consensus estimate that may be based upon current and previous analyst earnings estimates, operating actuals, expected reporting dates, footnotes and company-issued guidelines, the present invention provides indications of investment banking relationships and a consensus estimate that excludes input from banks with substantial business relationships with the company. In some embodiments, the present invention can also include recommended actions to take based upon data relating to an investment banking relationship, an earnings estimate and/or a consensus earnings estimate that excludes input from banks with substantial business relationships with the company.

For the purposes of this application, earnings estimates will be considered to be generated by any entity whose estimate may be included in an estimate consensus, however such entities may collectively be referred to as a "bank" without limiting the type of entity, institution or organization that may generate the earnings estimate.

Overview

Figure 1:
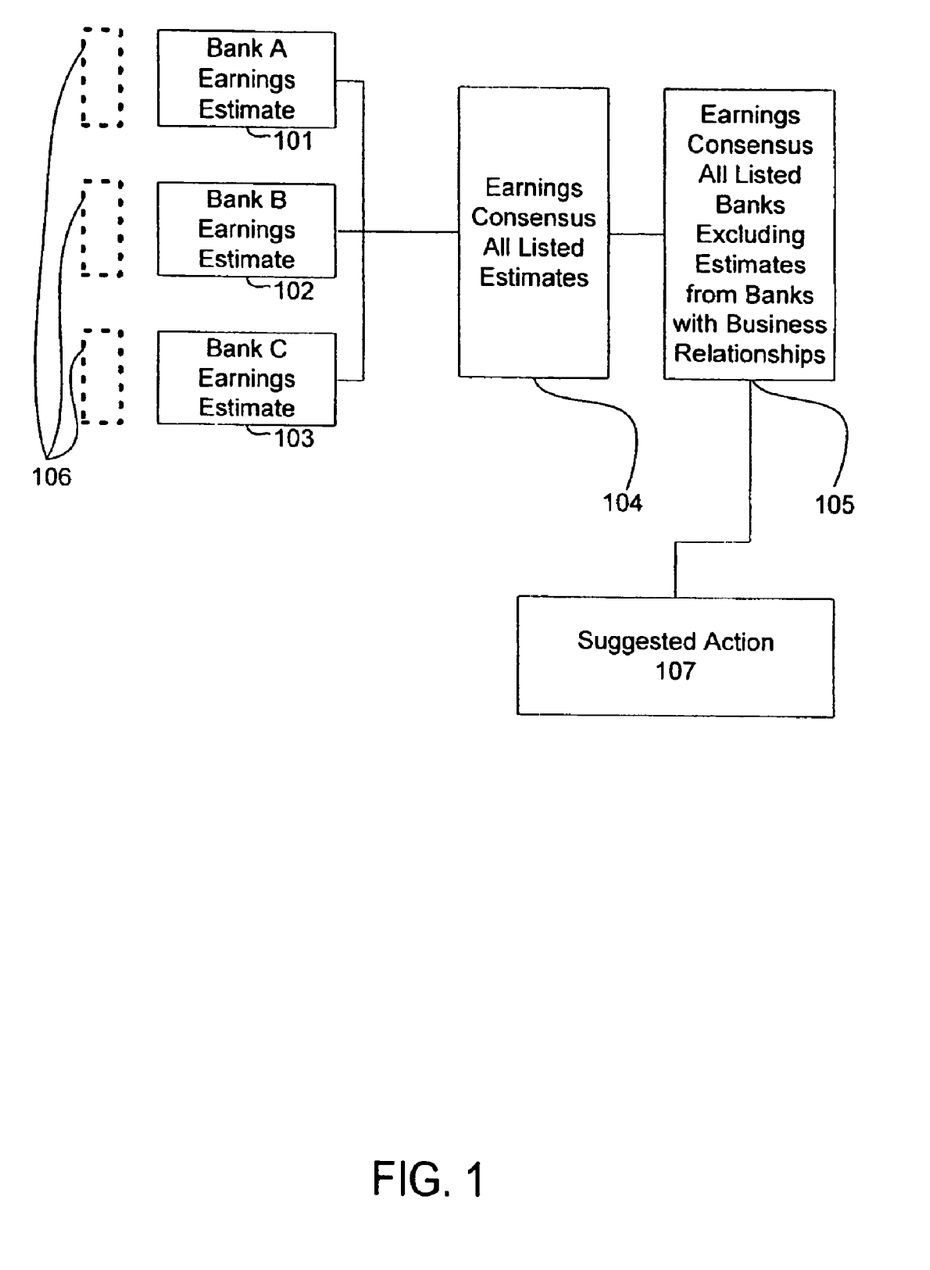
FIG. 1 illustrates a block diagram of some embodiments of the present invention.

Referring now to FIG. 1 a block diagram of one embodiment of the present invention is illustrated. Earnings estimates 101-103 can be generated from various banks or other financial institutions or entities. An earnings consensus can be generated for all listed estimates 104. The consensus can be calculated by any means suitable. For example, the consensus may include an average of estimates 101-103 received, using a weighted algorithm, a mean of estimates 101-103, an algorithm that eliminates a highest estimate and a lowest estimate or any other algorithm or means suitable. The present invention can also include an earnings consensus that excludes estimates from banks with substantial business relationships with the company concerned 105, such as an investment banking relationship. A comparison can be made between each consensus estimate, and, if desired with individual bank's estimates.

Business relationships can be ascertained utilizing various data gathering techniques. For example, in some embodiments, a Risk Management Clearinghouse can aggregate data indicative of a significant business relationship, such as an investment banking relationship. The data can be gathered, for example, from filings with the Securities and Exchange Commission (SEC), such as registration statements, prospectuses, statements regarding underwriting. Other sources can include news releases, or other public disclosures. In addition, data can be collected from private investigation firms or other sources.

In some embodiments, a source of a particular earning estimate 101-103 can be permitted to defend or otherwise explain the reasoning utilized to generate a particular earnings estimate and the reason for any discrepancy between the particular estimate 101-103 and a consensus estimate.

Embodiments of the present invention can also include generating a suggested action based upon the compiled data, including, for example, individual earnings estimates, the consensus with multiple estimates 104 and/or consensus with estimates from banks involved in investment banking and/or other business relationships excluded 105. A suggested action can be presented to a user via a GUI, an e-mail message, other electronic message, or any other means of conveying information. (Exemplary suggested actions are discussed at step 316 of the Methods Section below.)

It is also within the scope of this invention to include aggregating historical data indicating a history of earnings estimates, investment banking relationships, other business relationships between a provider of an earnings estimate, and actual earnings reports. The historical data can be useful to extrapolate a company's earnings and/or generate a suggested action.

Systems

Figure 2:
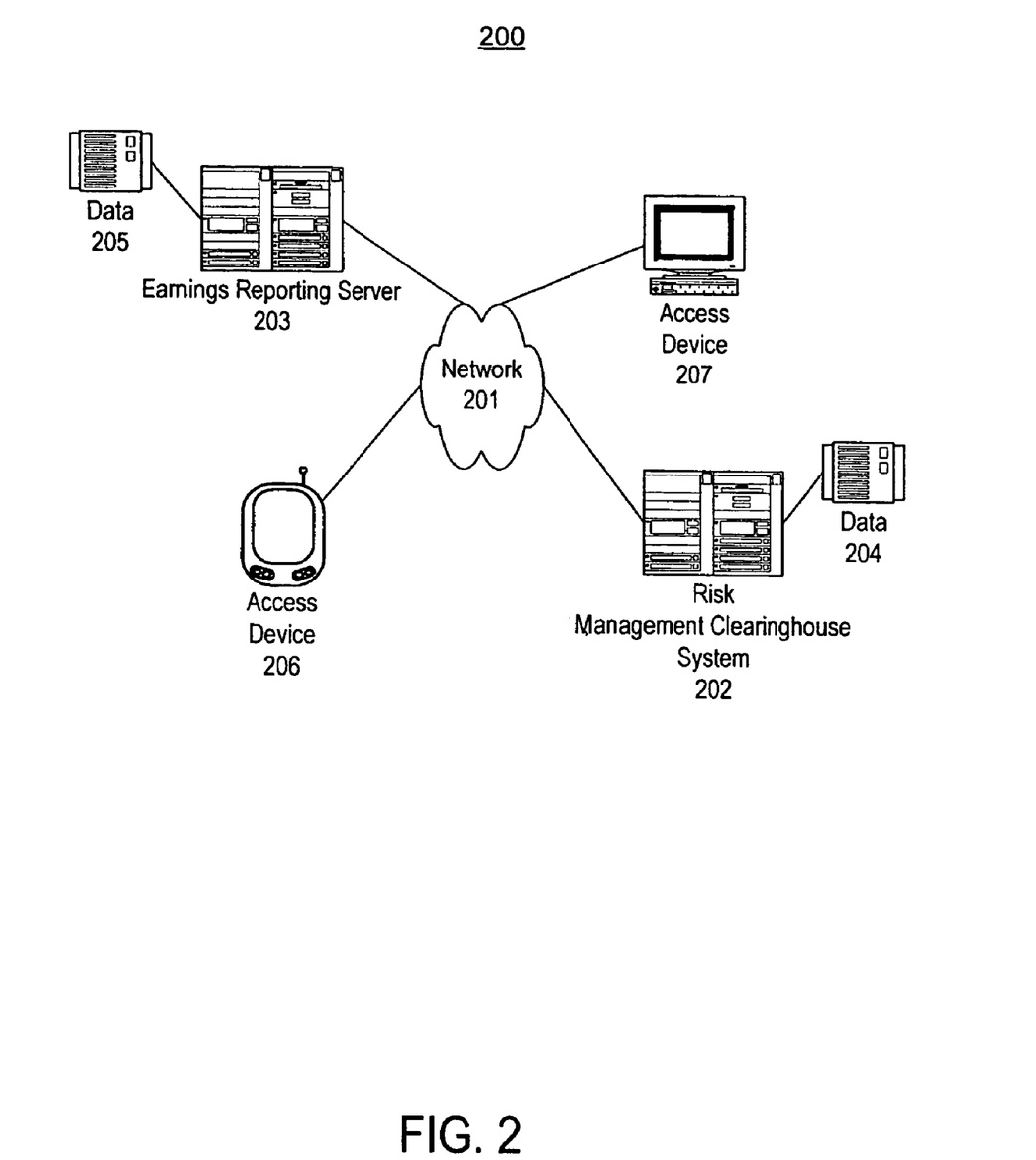
FIG. 2 illustrates a network of computer systems that can embody a Consensus Earnings Reporting server.

Referring now to FIG. 2, a network diagram illustrating some embodiments of the present invention is shown 200. An automated Earnings Reporting system 200 can include a computerized Earnings Reporting server 203 accessible via a distributed network 201 such as the Internet, or a private network. An automated RMC system 202 can include a computerized RMC system also accessible via the distributed network 201. A user can use an access device 206-207, such as a computerized system or wireless handheld device to receive, input, transmit or view information processed in the Earnings Reporting server 203, RMC system 202, a peer access device, or other network device. A protocol, such as, for example, the transmission control protocol internet protocol (TCP/IP) can be utilized to provide consistency and reliability.

Figure 6:
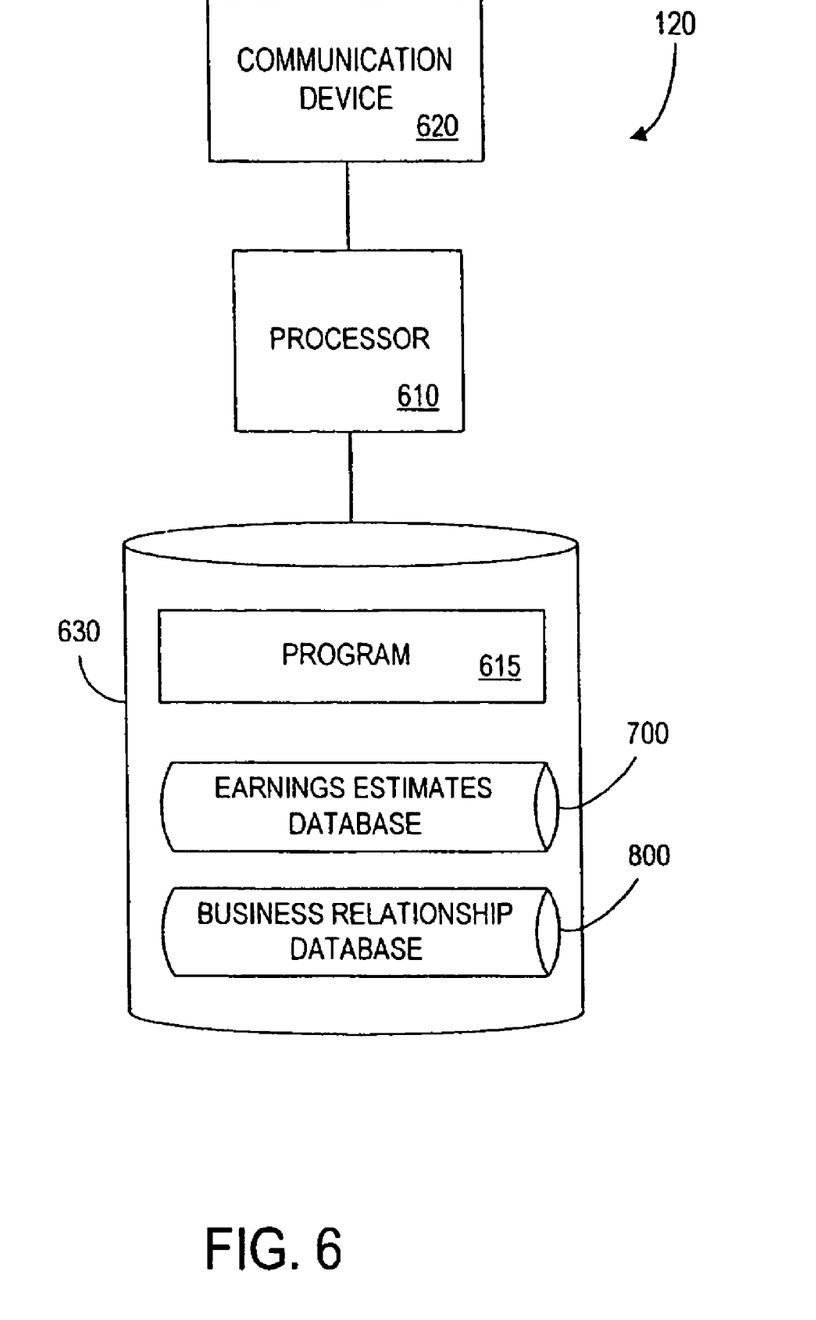
FIG. 6 illustrates a device which can be utilized while implementing embodiments of the present invention.

A system access device 206-207 used to access the Earnings Reporting server 203, RMC system 202, or other device can include a processor, memory and a user input device, such as a keyboard and/or mouse, and a user output device, such as a display screen and/or printer, as further detailed in FIG. 6. The system access devices 206-207 can communicate with the Earnings Reporting server 203 or RMC system 202 to access data and programs stored at the respective servers. A system access device 206-207 may interact with the Earnings Reporting server 203 or RMC system 202 as if the servers were a single entity in the network 200. However, the Earnings Reporting server 203 and RMC system 202 may include multiple processing and database sub-systems, such as cooperative or redundant processing and/or database servers that can be geographically dispersed throughout the network 200.

The RMC system 202 and Earnings Reporting server 203 can include one or more databases 204 storing data relating to earnings estimates, earnings reports, investment banking relationships, other business relationships, risk management, or other pertinent information. Information relating to and included in earnings estimates and reports can be aggregated into a searchable data storage structure. Gathering data into an aggregate data structure 204, such as a data warehouse, allows a server to have the data readily available for processing a risk management search associated with a company's earnings. Aggregated data 204 can also be scrubbed or otherwise enhanced to aid in searching.

Typically an access device 206-207 will access the RMC system 202 using client software executed at the system access device 206-207. The client software may include a generic hypertext markup language (HTML) browser, such as Netscape Navigator or Microsoft Internet Explorer, (a "WEB browser"). The client software may also be a proprietary browser, and/or other host access software. In some cases, an executable program, such as a Java™ program, may be downloaded from a server to the system access device 206-207 and executed at the system access device 206-207 as part of earnings estimates risk management software. Other implementations include proprietary software installed from a computer readable medium, such as a CD ROM. The invention may therefore be implemented in digital electronic circuitry, computer hardware, firmware, software, or in combinations of the above. Apparatus of the invention may be implemented in a computer program product tangibly embodied in a machine-readable storage device for execution by a programmable processor; and method steps of the invention may be performed by a programmable processor executing a program of instructions to perform functions of the invention by operating on input data and generating output.

Methods

Figure 3:
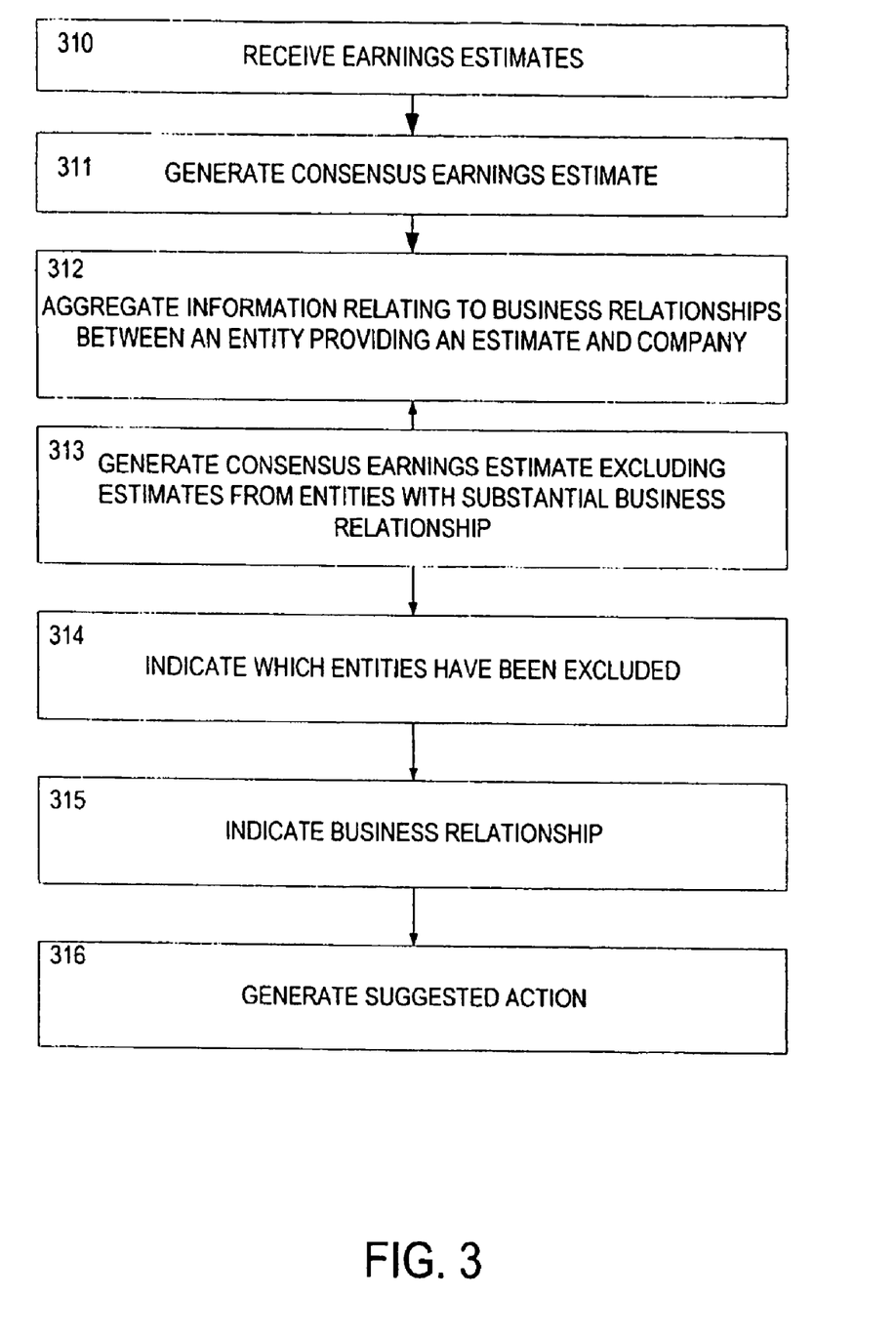
FIG. 3 illustrates a flow of exemplary steps that can be executed while implementing some embodiments of the present invention.

Referring now to FIG. 3, steps that can be performed while practicing the present invention are illustrated. From the perspective of an earnings estimate provider, risk management clearinghouse, or other service provider, at 310 earnings estimates can be received, such as, for example, via an electronic communication, facsimile, hardcopy, or voice call. In any case, the earnings estimates can be input into an electronic storage. At 311, a consensus earnings estimate can be generated. At 312 information relating to business relationships between an entity providing an estimate and a company can be aggregated.

At 313 a consensus earnings estimate can be generated that excludes estimates from entities with a business relationship, and in some embodiments, as a material business relationship or other predetermined threshold of business, with a company concerned. At 314, in some embodiments, an indication can be made to identify those entities that have been excluded from a related business earnings estimate consensus. For example, in order to be excluded, an entity may need to be involved with a threshold amount of business, or over a threshold amount of time. At 315, embodiments can also include an indication of a particular business relationship.

At 316, a suggested action can be generated based upon the earnings estimates and the aggregated data indicating business relationships. A suggested action can include, for example: an indication to buy or sell a security of a company: a indication to buy or sell a derivative indicating value of a company will increase/decrease within a predetermined period of time, such as for example, within 30 days following issuance of an earnings report or with 90 days of the earnings estimate consensus. In some embodiments, a suggested action may include notifying an appropriate authority.

Embodiments can also include allowing a user to select those entities whose estimates should be excluded from an earnings estimate consensus. Selection can allow additional options relating to the selected entity such as including an estimate from the excluded entity or providing details as to why the entity was excluded. Accordingly, embodiments can include presenting data relating to business relationships between an entity providing an earnings estimate and the company concerned. In some embodiments, the data can be presented, for example, as a result of a Risk Management Clearinghouse search or query.

Some embodiments can also include a verification step which can allow any of the entities or companies involved such as, for example, an excluded entity, to independently indicate the veracity of information put forth in a statement of a business relationship. Other embodiments can convey any information put forth with no value judgment, research or other indication relating to the veracity or completeness of any information conveyed.

Accordingly, embodiments can also include notifying an entity that its earnings estimate will be excluded from a consensus estimate and the reason for the exclusion and allow the entity to address the situation.

Figure 4:
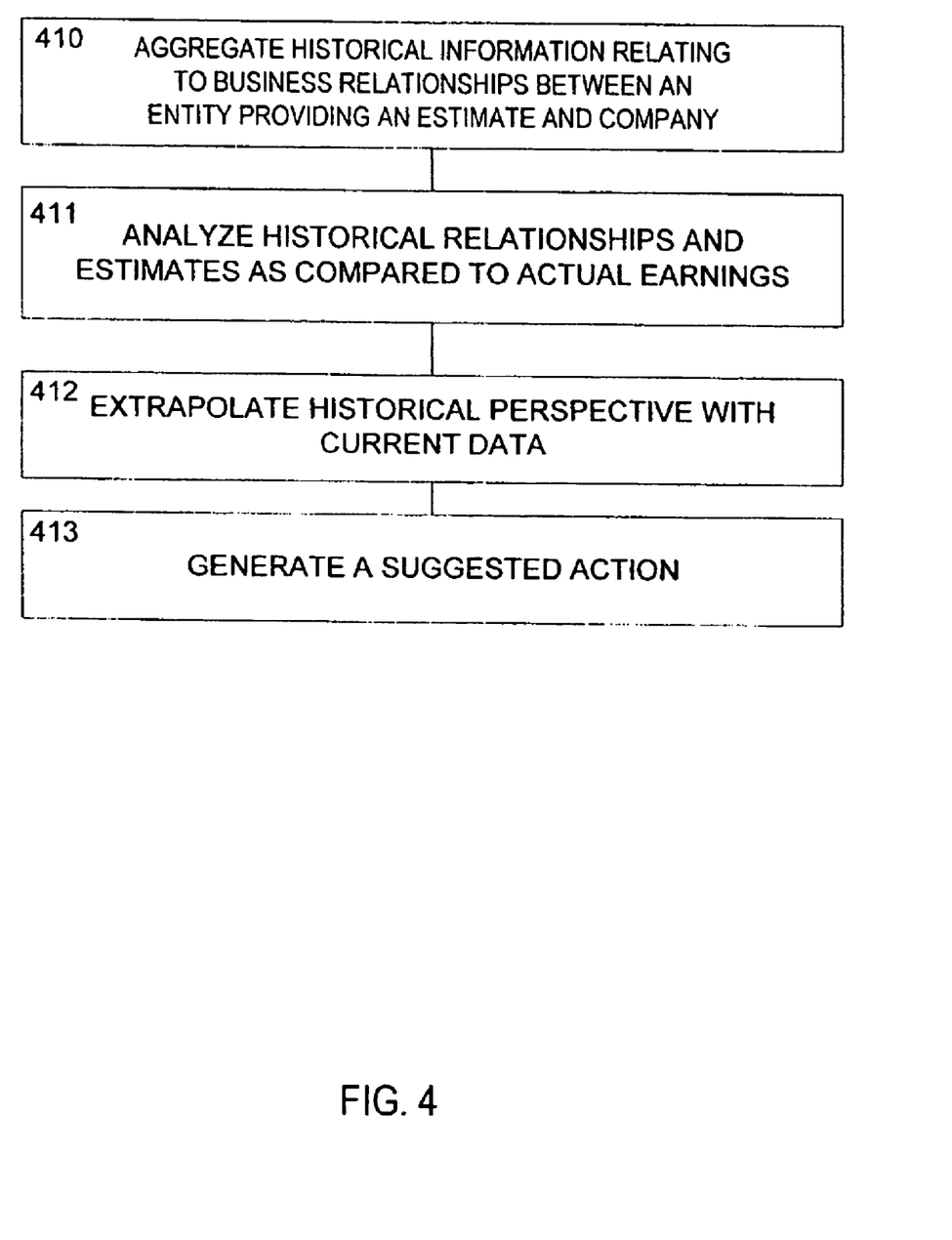
FIG. 4 illustrates a flow of exemplary steps that can be executed while implementing other embodiments the present invention.

Referring now to FIG. 4, additional steps that can be performed while implementing some embodiments of the present invention are illustrated. At 410, historical information can be aggregated relating to earnings estimates, such as, for example, information that relates to business relationships between an entity providing an earnings estimate and a company. At 411 historical relationships can be analyzed as compared to actual earnings. At 412, the historical perspective can be extrapolated with current data so that at 413, a suggested action can be generated.

Graphical Interface

Figure 5:
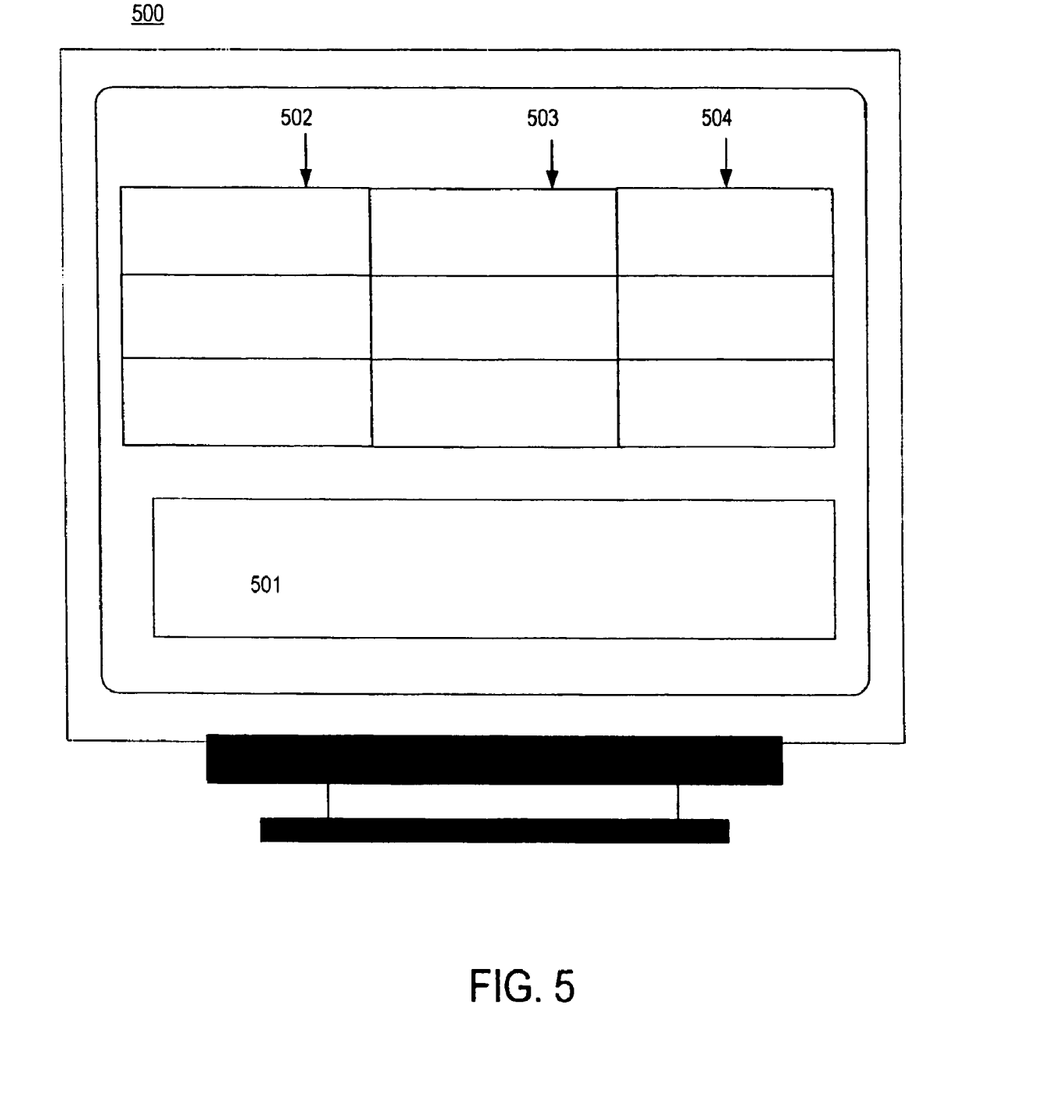
FIG. 5 illustrates an exemplary graphical user interface that can implement various aspects of the present invention.

Referring now to FIG. 5, an exemplary GUI 500 that can be utilized while practicing the present invention is illustrated. A portion of a display 501 can display information that relates to a company, such as a publicly traded company. Another portion of the display 502 can include information descriptive of an earnings estimate 101-103 as well as the entity responsible for generating the earnings estimate. At 503 a consensus generated with some estimates excluded according to a predetermined criteria, or in some embodiments, a user identified criteria. A portion 504 can also display instructions relating to a suggested action 107 based upon the earnings estimate 101-103 and the business relationships associated with the earnings estimate 101-103.

Communication Controller

FIG. 6 illustrates an exemplary Earnings Reporting controller 203 that is descriptive of the devices shown, for example, in FIG. 2 according to some embodiments of the present invention. The Earnings Reporting controller 203 comprises a processor 610, such as one or more Intel® or AMD® processors, coupled to a communication device 620 configured to communicate via a communication network (not shown in FIG. 6). The communication device 620 may be used to communicate, for example, with one or more network access devices 206-207.

The processor 610 is also in communication with a storage device 204, 630. The storage device 204, 630 may comprise any appropriate information storage device, including combinations of magnetic storage devices (e.g., magnetic tape and hard disk drives), optical storage devices, and/or semiconductor memory devices such as Random Access Memory (RAM) devices and Read Only Memory (ROM) devices.

In some embodiments, the storage device 209, 630 can store a program 615 for controlling the processor 610. The processor 610 performs instructions of the program 615, and thereby operates in accordance with the present invention. For example, the processor 610 may receive an indication data relating to earnings reports and one or more business relationships and generate a consensus earnings reports and/or a suggested action based upon the data. The processor 610 may also transmit information comprising the Earnings Reporting and/or one or more suggested actions to appropriate destinations.

The storage device 630 can store for example, an Earnings Reporting information database 700 and a RMC database 800. The illustrations and accompanying descriptions of the databases presented herein are exemplary, and any number of other database arrangements could be employed besides those suggested by the figures.

A number of embodiments of the present invention have been described. Nevertheless, it will be understood that various modifications may be made without departing from the spirit and scope of the invention. For example, certified hard copy documents can be gathered and scanned into a system such that the scanned image, and/or the data contained therein can be utilized or forwarded to a user as appropriate. Accordingly, other embodiments are within the scope of the following claims.

What is claimed is:

1. A computerized apparatus for managing risk associated with earnings estimates for a company, the apparatus comprising:

a computer server comprising a processor and a digital storage and accessible with a system access device via a communications network; and executable software stored on the computer server and executable on demand, the executable software operative with the processor to cause the computer server to:

receive into the digital storage data descriptive of multiple earnings estimates, each earnings estimate generated by a respective bank;

receive into the digital storage data indicative of one or more business relationships comprising a bank and the company;

generate a first consensus estimate excluding earnings estimates received from the bank with the data indicative of one or more business relationships with the company;

transmit, to the bank, data comprising a message that the bank's earnings estimate is excluded from the first consensus estimate; and generate a suggested action based upon the first consensus estimate.

2. The computerized apparatus of claim 1 wherein the executable software is additionally operative with the processor to cause the computer server to:

generate a second consensus estimate based upon the earnings estimates received, including the earnings estimates received from the bank with the data indicative of one or more business relationships with the company; and generate the suggested action based upon the first consensus estimate and the second consensus estimate.

3. The computerized apparatus of claim 1 wherein the executable software is additionally operative with the processor to cause the computer server to:

generate a marker to correlate with the existence of data indicative of one or more business relationships comprising the bank and the company.

4. The computerized apparatus of claim 1 wherein the executable software is additionally operative with the processor to cause the computer server to:

receive a request data relating to a business relationship between the bank and the company.

5. The computerized apparatus of claim 1 wherein the suggested action comprises acquiring a security instrument for the company.

6. The computerized apparatus of claim 1 wherein the suggested action comprises acquiring a derivative which will be profitable if a price of a stock for the company declines within a predetermined period.

7. The computerized apparatus of claim 1 wherein the suggested action comprises acquiring a derivative which will be profitable if a price of a stock for the company increases within a predetermined period.

8. The computerized apparatus of claim 6 or 7 wherein the predetermined period comprises 30 days following an announcement of company earnings.

9. The computerized apparatus of claim 1 wherein the executable software is additionally operative with the processor to cause the computer server to:
receive updated information relating to the one or more business relationships and generate a modified suggested action based upon the updated information.

10. The computerized apparatus of claim 1 wherein the executable software is additionally operative with the processor to cause the computer server to transmit data comprising a reason for the exclusion of the earnings estimate from the consensus estimate.

11. A processor-implemented method for managing risk associated with earnings estimates for a company, the method comprising:
receiving digital data descriptive of multiple earnings estimates into a computer storage;
receiving digital data descriptive of one or more indications of a bank conducting business with the company into a computer storage;
generating via a processor a first consensus estimate based upon the digital data descriptive of the multiple earnings estimates received and comprising the data descriptive of an earnings estimate generated by the bank conducting business with the company;
generating a second consensus estimate based upon the digital data descriptive of the multiple earnings estimates received and excluding the data descriptive of earnings estimates generated by the bank conducting business with the company;
transmitting, to the bank, data comprising a message that the bank's earnings estimate is excluded from the first consensus estimate; and
generating an indication in human readable form of a suggested action based upon the first consensus estimate and the second consensus estimate.

12. The processor-implemented method of claim 11 additionally comprising the step of:
generating digital data indicative of a business relationship between a bank and the company.

13. The processor-implemented method of claim 12 additionally comprising the step of receiving a request for data descriptive of the business conducted comprising the bank and the company.

14. The processor-implemented method of claim 11 wherein the suggested action comprises acquiring a security for the company.

15. The processor-implemented method of claim 11 wherein the suggested action comprises acquiring a derivative which will be profitable if a price of a stock for the company declines within a predetermined period.

16. The processor-implemented method of claim 11 wherein the suggested action comprises acquiring a derivative which will be profitable if a price of a stock for the company increases within a predetermined period.

17. The processor-implemented method of claim 15 or 16 wherein the predetermined period comprises days following an announcement of company earnings.

18. The processor-implemented method of claim 11 additionally comprising generating digital data comprising a message that the earnings estimate generated by the bank will be excluded from the calculation of the second consensus estimate and a reason for the exclusion.

19. Computer executable program code residing on a computer-readable medium, the program code comprising instructions for causing the computer to:
receive multiple earnings estimates related to a company;
receive one or more indications of a bank conducting business with the company;
generate via a processor a first consensus estimate based upon the earnings estimates received;
generate a second consensus estimate based upon the earnings estimates received, but excluding an earnings estimate received from the bank conducting business with the company;
transmit, to the bank, data comprising a message that the bank's earnings estimate is excluded from the first consensus estimate; and
generate a suggested action based upon the first consensus estimate and the second consensus estimate.

20. The apparatus of claim 1, wherein the earnings estimates received from the bank are excluded based on the bank being involved in a threshold amount of business with the company.

21. The apparatus of claim 1, wherein the earnings estimates received from the bank are excluded based on the bank being involved over a threshold amount of time in a business relationship with the company.

22. The processor-implemented method of claim 11, further comprising processor-execution of the action indicated by the human readable suggested action indication.

23. The processor-implemented method of claim 14, further comprising computer-implemented acquisition of a security for the company according to the suggested action indication.

24. The processor-implemented method of claim 15, further comprising computer-implemented acquisition of a derivative based on the suggested action indication.

25. The processor-implemented method of claim 16, further comprising computer-implemented acquisition of a derivative based on the suggested action indication.

* * * * *